United States Patent

Hechtman et al.

(10) Patent No.: US 9,477,599 B2
(45) Date of Patent: Oct. 25, 2016

(54) WRITE COMBINING CACHE MICROARCHITECTURE FOR SYNCHRONIZATION EVENTS

(71) Applicant: Advanced Micro Devices, Inc., Sunnyvale, CA (US)

(72) Inventors: Blake A. Hechtman, Durham, NC (US); Bradford M. Beckmann, Redmond, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 371 days.

(21) Appl. No.: 13/961,561

(22) Filed: Aug. 7, 2013

(65) Prior Publication Data

US 2015/0046652 A1    Feb. 12, 2015

(51) Int. Cl.
*G06F 12/00* (2006.01)
*G06F 13/00* (2006.01)
*G06F 13/28* (2006.01)
*G06F 12/08* (2016.01)
*G06F 12/12* (2016.01)

(52) U.S. Cl.
CPC ....... *G06F 12/0815* (2013.01); *G06F 12/0811* (2013.01); *G06F 12/128* (2013.01); *Y02B 60/1225* (2013.01)

(58) Field of Classification Search
CPC ........... G06F 12/0815; G06F 12/0811; G06F 12/128; G06F 12/12; Y02B 60/1225
USPC ........ 711/122, 151, 147, 117, 130, 141, 119, 711/118
See application file for complete search history.

(56) References Cited

U.S. PATENT DOCUMENTS

2012/0117323 A1* 5/2012 Cypher ............... G06F 12/0855 711/118
2013/0262777 A1* 10/2013 Ghai .................... G06F 12/126 711/136

* cited by examiner

*Primary Examiner* — Yong Choe
*Assistant Examiner* — Shane Woolwine
(74) *Attorney, Agent, or Firm* — Volpe and Koenig, P.C.

(57) ABSTRACT

A method, computer program product, and system is described that enforces a release consistency with special accesses sequentially consistent (RCsc) memory model and executes release synchronization instructions such as a StRel event without tracking an outstanding store event through a memory hierarchy, while efficiently using bandwidth resources. What is also described is the decoupling of a store event from an ordering of the store event with respect to a RCsc memory model. The description also includes a set of hierarchical read/write combining buffers that coalesce stores from different parts of the system. In addition, a pool component maintains partial order of received store events and release synchronization events to avoid content addressable memory (CAM) structures, full cache flushes, as well as direct write-throughs to memory. The approach improves the performance of both global and local synchronization events since a store event may not need to reach main memory to complete.

20 Claims, 8 Drawing Sheets

«WRITE COMBINING CACHE MICROARCHITECTURE FOR SYNCHRONIZATION EVENTS»

BACKGROUND

1. Field

The embodiments are generally directed to managing memory, and more specifically to managing memory among heterogeneous computer components.

2. Background Art

A computing device generally includes one or more processing units (e.g., a central processing unit (CPU), a graphics processing unit (GPU), a general purpose GPU (GPGPU), an accelerated processing unit (APU), or the like), that access a shared main memory. The processing units may execute programs (e.g., instructions or threads) that result in accesses to main memory. Because memory accesses may traverse a memory hierarchy including levels of cache and main memory, memory accesses may have different latencies, and may be performed in a different order than what was intended by the programs. In addition there may be conflicts, e.g., when two memory accesses attempt to store data in the same memory location.

Memory accesses are also called memory events, and examples include a store event (i.e., a memory access request to write data to main memory), a load event (i.e., a memory access request to read data from main memory), and synchronization events that are used to order conflicting memory events.

Memory consistency models provide rules for ordering memory events. A type of memory consistency model, release consistency with special accesses sequentially consistent (RCsc), provides a framework for event ordering for parallel programs with synchronization. Current systems that implement an RCsc memory model, a write-through (WT) memory system and a write-combining (WC) memory system, have difficulty with synchronization events such as a store release (StRel) synchronization event.

A StRel synchronization event is a release synchronizing store instruction that acts like an upward memory fence such that prior memory operations are visible to threads that share access to the ordering point before the store event portion of the StRel completes. A load acquire (LdAcq) synchronization event is a synchronizing load instruction that acts as downward memory fence such that later operations cannot occur before this operation.

Upon executing a StRel synchronization event in a WT memory system, data is immediately written-through to main memory which is an inefficient use of the precious bandwidth resources to main memory. In addition, the system tracks acknowledgements for individual store completions which is highly inefficient. Further, upon receiving a load acquire synchronization event, the system performs a full cache flush to invalidate clean and potentially stale data which makes data reuse in the presence of synchronization impossible.

The WC memory system uses cache hierarchies to coalesce store events. Executing a StRel synchronization event in the WC triggers a slow and intensive cache flush to determine when the prior stores have completed to a next level of hierarchy. A cache flush entails walking through an entire cache hierarchy to track outstanding store events to completion.

A hierarchical directory/snooping cache coherence protocol solution is a "read for ownership" solution that could support an RCsc memory consistency model, however, the memory access requests to write data encounter long delays. A requesting processor (e.g., a CPU or GPU) has to read or own a memory block before writing to local cache and completing a store event.

BRIEF SUMMARY OF EMBODIMENTS

What is needed therefore, are embodiments that enforce an RCsc memory model and can execute release synchronization instructions such as a StRel event without tracking an outstanding store event through a memory hierarchy, while efficiently using bandwidth resources. In embodiments, a requesting processor does not have to read or own a memory block before writing in local cache and completing a store event. Embodiments improve the performance of both global synchronization events (e.g., writing to main memory for completion) and local synchronization events (e.g., writing to a common ordering point such as level 2 cache for completion) since the cache hierarchy does not need to be flushed and a store event may not need to reach main memory to complete. Embodiments decouple a store event from an ordering of the store event with respect to a RCsc memory model.

Embodiments include a method, computer program product, and a system. For example, the system includes a set of hierarchical read/write combining buffers that coalesce stores from different parts of the system. In addition, a component maintains a partial order of received store events and release synchronization events to avoid content addressable memory (CAM) structures, full cache flushes, and direct write-throughs to memory. Embodiments provide RCsc memory model programmability while efficiently using limited bandwidth.

Certain embodiments include a method, computer program product, and a system. For example, when a store memory event is received, a method embodiment includes writing data to a level n cache, where n is an integer representing the level of cache hierarchy, and writing a store entry that includes an address of the data in the level n cache to a level n pool, where the level n pool maintains a partial order among the store entry, a prior received store entry, and a release marker entry. When a release marker is present, the method further includes ordering the store entry in the level n pool to be after a most-recent release marker. The level n cache and corresponding level n pool are closer to a processor (e.g., core) than a level (n+1) cache and a corresponding level (n+1) pool. For example, when n is 1, the level 1 cache and corresponding level 1 pool are closer to the processor than the level 2 cache and the corresponding level 2 pool.

Certain embodiments include a computer-readable storage device that includes stored instructions which are executed by a processing unit. In response to receiving a store memory event, instructions are executed that cause the processing unit to perform operations. The operations include writing data to a level n cache, where n is an integer representing the level of cache hierarchy, and writing a store entry that includes an address of the data in the level n cache to a level n pool, where the level n pool maintains a partial order among the store entry, a prior received store entry, and a release marker entry. When a release marker is present, further operations include ordering the store entry in the level n pool to be after a most-recent release marker.

A further embodiment includes a processing unit including one or more compute units configured to respond to a store memory event. The processing unit writes data to a level n cache, where n is an integer representing the level of cache hierarchy. The processing unit also writes a store entry that includes an address of the data in the level n cache to a level n pool, where the level n pool maintains a partial order among the store entry, a prior received store entry, and a release marker entry. When a release marker is present the processing unit orders the store entry in the level n pool to be after a most-recent release marker.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

The embodiments will be described with reference to the accompanying drawings. Generally, the drawing in which an element first appears is typically indicated by the leftmost digit(s) in the corresponding reference number.

DETAILED DESCRIPTION OF EMBODIMENTS

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Computing devices process data and provide many applications to users. Example computing devices include, but are not limited to, mobile phones, personal computers, workstations, and game consoles. Computing devices use a central processing unit ("CPU") to process data. A CPU is a processor which carries out instructions of computer programs or applications. For example, a CPU carries out instructions by performing arithmetical, logical and input/output operations. In an embodiment, a CPU performs control instructions that include decision making code of a computer program or an application, and delegates processing to other processors in the electronic device, such as a graphics processing unit ("GPU").

A GPU is a processor that is a specialized electronic circuit designed to rapidly process mathematically intensive applications on electronic devices. The GPU has a highly parallel structure that is efficient for parallel processing of large blocks of data, such as mathematically intensive data common to computer graphics applications, images and videos. The GPU may receive data for processing from a CPU or generate data for processing from previously processed data and operations. In an embodiment, the GPU is a hardware-based processor that uses hardware to process data in parallel.

Due to advances in technology, a GPU also performs general purpose computing (also referred to as GPGPU computing). In the GPGPU computing, a GPU performs computations that traditionally were handled by a CPU. An accelerated processing unit (APU) includes at least the functions of a CPU and a GPU. The GPU can be a GPGPU.

In an embodiment, a GPU includes one or more compute units (CUs) that process data. A compute unit (CU) includes arithmetic logic units (ALUs) and other resources that process data on the GPU. Data can be processed in parallel within and across compute units.

In an embodiment, a control processor on a GPU schedules task processing on compute units. Tasks include computation instructions. Those computation instructions may access data stored in the memory system of a computing device and manipulate the accessed data. In an embodiment, the data may be stored in volatile or non-volatile memory. An example of volatile memory includes random access memory (RAM). Examples of RAM include dynamic random access memory (DRAM) and static random access memory (SRAM). Volatile memory typically stores data as long as the electronic device receives power. Examples of non-volatile memory include read-only memory (ROM), flash memory, ferroelectric RAM (F-RAM), hard disks, floppy disks, magnetic tape, optical discs, etc. Non-volatile memory retains its memory state when the electronic device loses power or is turned off.

Figure 1:
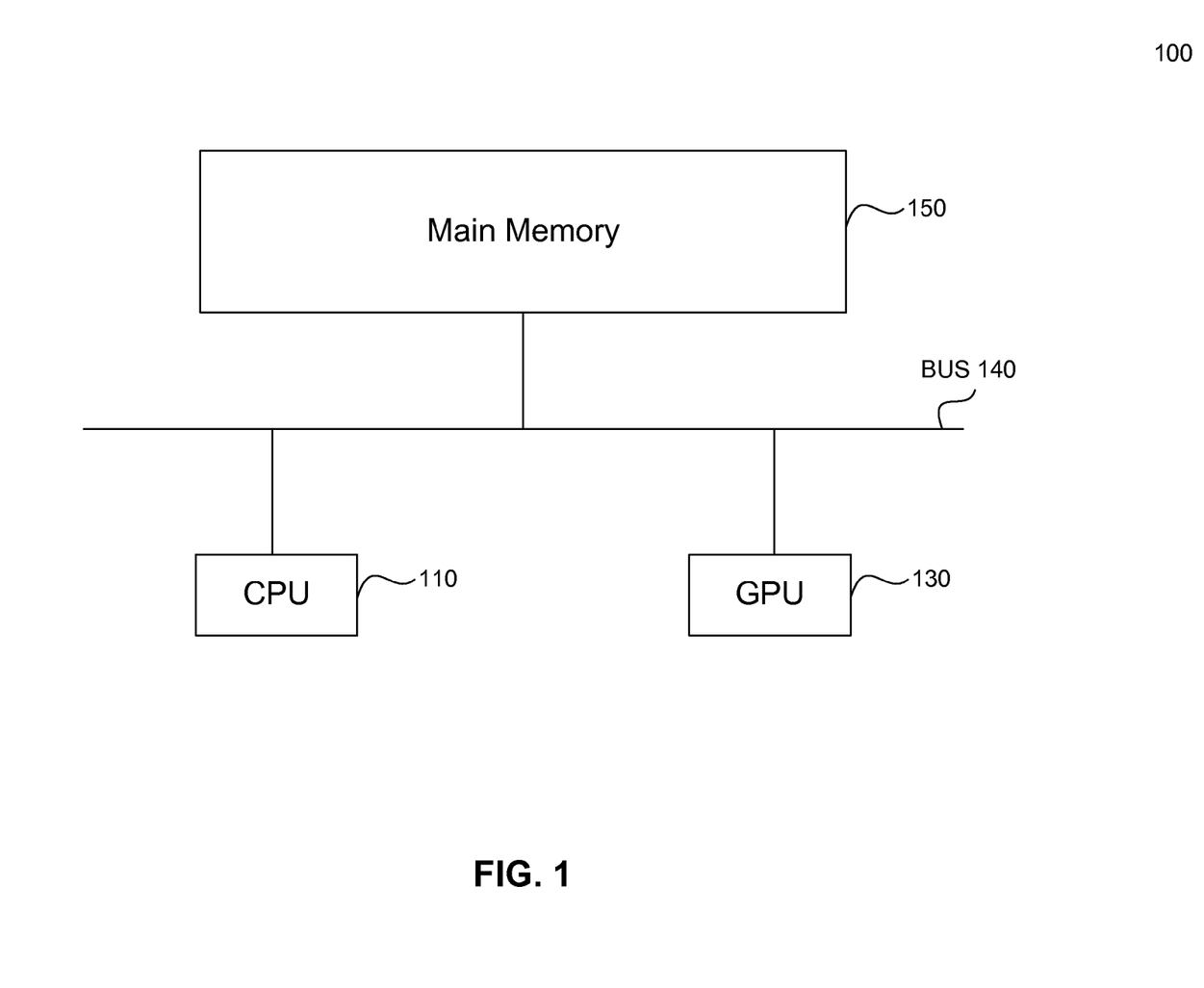
FIG. 1 illustrates an APU environment, according to an embodiment.

FIG. 1 illustrates an APU environment, according to an embodiment. In the example shown, system 100 is an APU environment that includes CPU 110, GPU 130, main memory 150, and bus 140.

Bus 140 may be any type of communication infrastructure used in computer systems, including a peripheral component interface (PCI) bus, a memory bus, a PCI Express (PCIE) bus, front-side bus (FSB), hypertransport (HT), or another type of communication structure or communications channel whether presently available or developed in the future.

Figure 2:
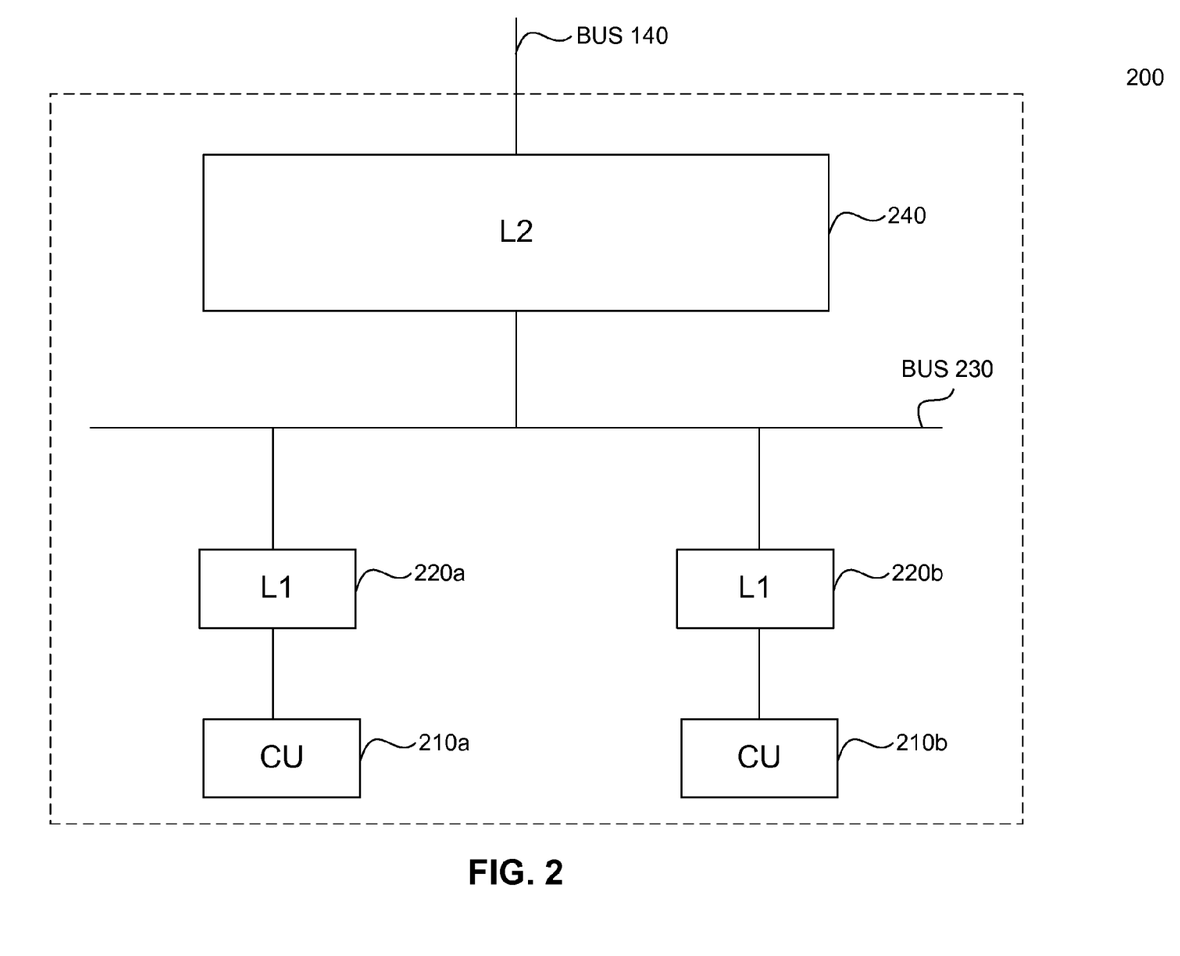
FIG. 2 illustrates a write-back write-combine system, according to an embodiment.

FIG. 2 illustrates a write-combining (WC) system, according to an environment. WC system 200 includes a conventional GPU and bus 140. WC system 200 includes CUs 210a and 210b, and a multi-tiered write-combining cache including Level 1 (L1) caches 220a and 220b, as well as Level 2 (L2) cache 240. L2 cache 240 is shared among CUs 210 in system 200. Bus 230 is substantially the same as bus 140 of FIG. 1.

In WC system 200, write-combining caches provide coherence for data-race-free programs (e.g., programs free of memory accesses conflicts) by writing updates to an ordering point (e.g., L2 cache 240 or main memory 150) at synchronization events. In addition, write-combining caches use a write-back policy that keeps previously written data in cache longer than the WT alternative. This policy increases the chance that the results of two store events coalesce in cache before consuming the limited bandwidth at a synchronization event to evict the data to a next-level cache in the memory hierarchy. However, the cost of a synchronization event in WC system 200 is high. Upon execution of a StRel synchronization event, for example, WC system 200 must perform a full cache flush to find and flush outstanding writes throughout the cache hierarchy to completion to ensure proper ordering of memory events. A write is data written by a store event. WC system 200 searches L1 caches 220a and 220b as well as L2 cache 240 to find data previously written, also called dirty data. Once dirty data is found, WC system 200 evicts the dirty data to a next level of cache hierarchy, or main memory 150 if a next-level cache is not present, and waits for acknowledgements to be received before processing another memory event. The cache flush process is a very slow and tedious process to be avoided.

Embodiments utilize read-write combining caches to enforce a RCsc model, and avoid tracking outstanding store events via the memory hierarchy. Embodiments utilize extra knowledge to manage a partial order of outstanding writes and release synchronization events separately from the outstanding writes that move through a memory hierarchy. Because store events are not tracked via the memory hierarchy, acknowledgement messages are not needed for store event completions resulting in reduced traffic. In addition, embodiments allow a store event to complete without having to write-through to main memory 150.

A memory fence is an operation used to delay a memory access until the previous memory access has been performed. Synchronization events utilize memory fences to provide order by making results visible (i.e., available for reading) in a globally shared memory so that other instructions in the computing device may utilize the results.

The RCsc consistency model requires that prior store events that occur before a StRel synchronization event be visible (i.e., readable) in a specified scope (e.g., global or local) and that loads after a LdAcq appear to be executed after the LdAcq. Also, the LdAcqs and StRels themselves obey sequential consistency so a StRel needs to complete the writes before a LdAcq may proceed to read the writes.

A scope is a group of threads that access a shared memory or a common ordering point. Global scope requires global synchronization and a store event is complete when the data written in main memory 150 is visible to other threads in the system. Local scope requires local synchronization and a store event is complete when the data is written to a common ordering point such as a level 2 cache, and is visible to threads that share access to that common ordering point. The ability to synchronize to a local scope when possible, instead of having to synchronize to a global scope provides considerable savings with regards to limited bandwidth access to main memory, reduced latency, and power savings.

Figure 3:
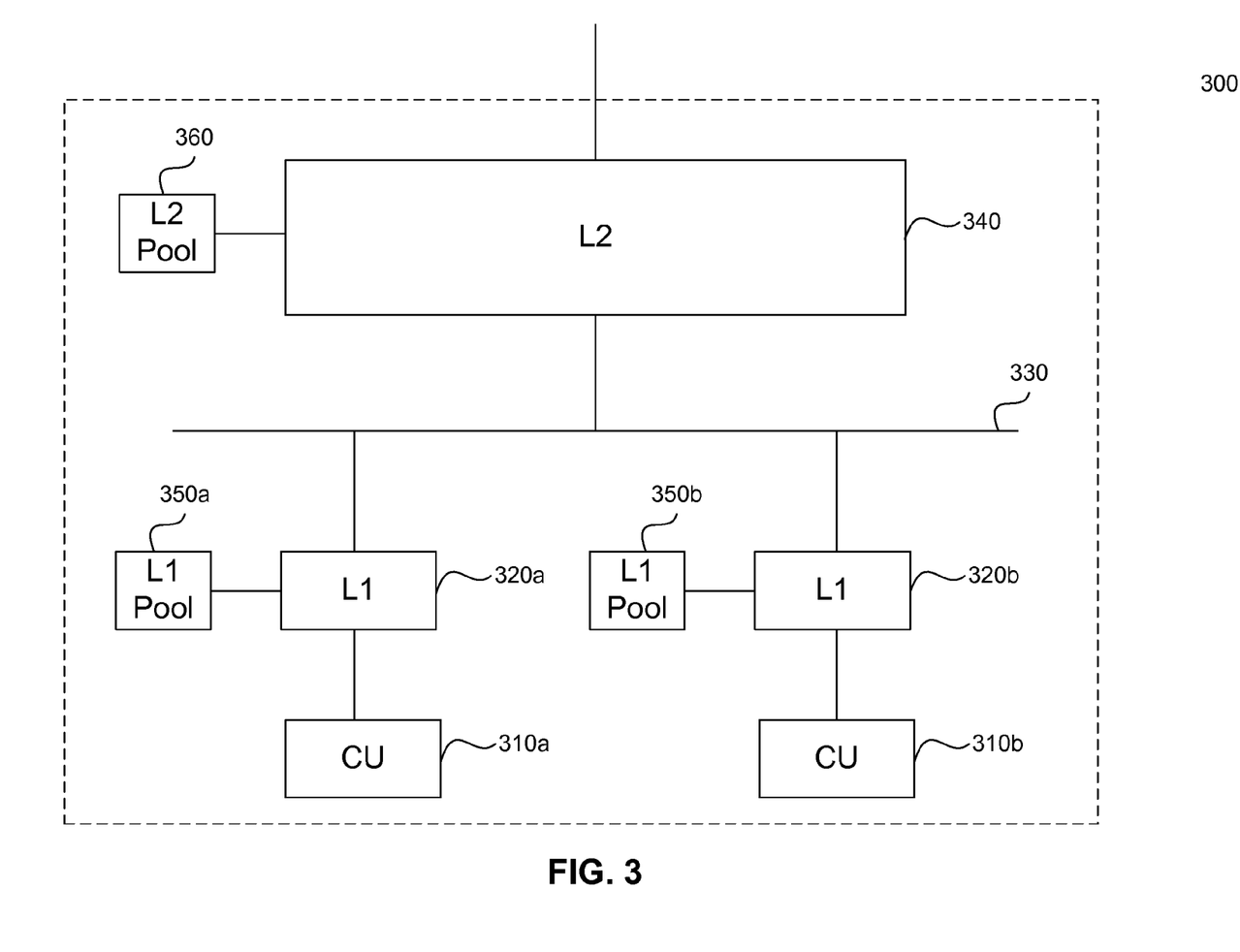
FIG. 3 illustrates a GPU, according to an embodiment.

FIG. 3 illustrates a GPU, according to an embodiment. System 300 includes a memory hierarchy of read-write combining buffers L1 cache 320a, L1 cache 320b, and L2 cache 340, corresponding co-located pool components L1 pool 350a, L1 pool 350b and L2 pool 360, as well as compute units CU 310a and CU 310b.

Pool components contain knowledge to track outstanding store events separately from the ordering of store events in the memory hierarchy that occurs when enforcing an RCsc memory model. Pool components L1 pool 350a, L1 pool 350b, and L2 pool 360 contain knowledge that enables system 300 to track which prior writes and corresponding addresses that may not yet be written back to main memory 150, without having to perform a cache walk, or implementing power-hungry CAM lookups to track acknowledgements.

Pool components L1 pool 350a, L1 pool 350b, and L2 pool 360 may be implemented for example, by a synchronization First In First Out (S-FIFO) or a Bloom-filter with signatures as are well known in the art. A pool component may contain entries associated with a store event or a release synchronization event. An entry associated with a store event may include but is not limited to an address in main memory and a thread identity of a store event. A thread identity is used to recognize different threads. An entry associated with a release synchronization event is a release marker that may include but is not limited to a thread identity of a release synchronization event.

Figure 4:
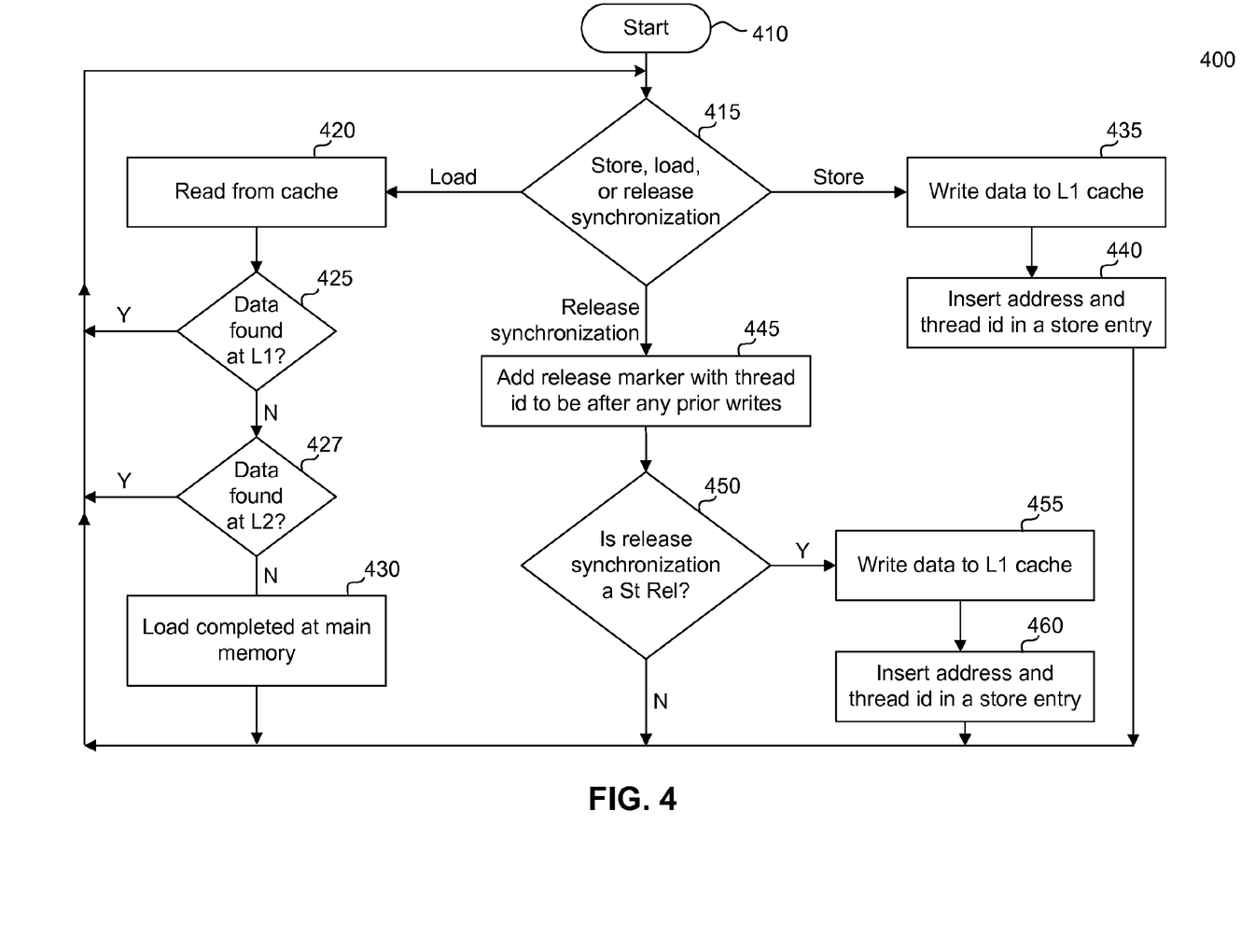
FIG. 4 illustrates a method of handling the receipt of memory events, according to an embodiment.

FIG. 4 illustrates a method of handling the receipt of memory events, according to an embodiment. In one example, system 100 and system 300 may be used to demonstrate method 400. It is to be appreciated that operations in method 400 may be performed in a different order than shown, and method 400 may not include all operations shown. For ease of discussion, and without limitation, method 400 will be described in terms of elements shown in FIG. 1 and FIG. 3.

Method 400 begins at step 410 and proceeds to step 415.

At step 415, memory events such as a store, a load, or a release synchronization are received from a compute unit such as CU 310a. The memory events are read from a software program e.g., instruction code, in program order.

When a load event is received, at step 420, method 400 looks for the address of the data in L1 cache 320a. At step 425, if the data is found in L1 cache 320a (a hit), the data is read and method 400 returns to step 415 to await another memory event. If the data is not found (a miss), method 400 proceeds to step 427. If L2 cache 340 is not present, method 400 proceeds to step 430.

At step 425, if the data is partially found (a partial hit), the dirty data in L1 cache 320a is written to L2 cache 340. Method 400 proceeds to step 427.

At step 427, method 400 looks for the data, or the remaining data in the case of a partial hit, in L2 cache 340; if the data or the remaining data is found (a hit), the data is read and method 400 returns to step 415. Thus, the load can be completed at level 2 rather than at main memory 150.

At step 427, if the data is not found in L2 cache 340 (a miss), or if L2 cache 340 is not present, method 400 proceeds to step 430.

At step 427, if the data is partially found and read from L2 cache 340 (a partial hit), the dirty data in L2 cache 340 is written to main memory 150. Data at L1 cache 320a and L1 320b with that address are invalidated, and method 400 proceeds to stop 430.

At step 430, the data is read from main memory 150. Method 400 proceeds to step 415.

When a store event is received at step 415, method 400 proceeds to step 435.

At step 435, method 400 writes the data affiliated with an address to L1 cache 320a and the data is called dirty data as it is not the same as the memory location at the same address in main memory 150.

At step 440, a store entry is written to L1 pool 350a that can include but is not limited to the address location in main memory 150 to which the data is to be written, and a thread identity. A thread is a work item involved with the current instruction execution that includes the store event. The L1 pool 350a maintains a partial order among the store entry, any prior received store entries that may exist, and any release marker entries.

In an example, two groups of prior store entries may exist in L1 pool 350a that are separated by a release marker described below. While no particular order within a group of prior store entries exists, the first group of prior store entries is ordered to be evicted before the release marker, and the second group is ordered to be evicted after the release marker. Thus there is partial order in the pool.

The store entry is written in L1 pool 350a to be after the most-recent release marker. In the example, the store entry would be added to the second group of existing prior store entries in no particular order.

Method 400 proceeds to step 415.

When a release synchronization event such as a release, a StRel, a fence, a kernel end, or a barrier operation is received at step 415, method 400 proceeds to step 445. A release marker is written to L1 pool 350a and ordered to be after any prior write entries in L1 pool 350a. The entry of the release marker in L1 pool 350a triggers eviction of any prior write entries from the L1 pool 350a. Thus, the release marker will be evicted after the prior entries in L1 pool 350a to ensure proper visibility of prior writes.

At step 450, if the release synchronization event is a StRel, method 400 proceeds to step 455. At step 455, method 400 writes data associated with the store event portion of the StRel to L1 cache 320a. At step 460, a corresponding store entry associated with the store event portion of the StRel is made to L1 pool 350a and ordered to be after the most-recent release marker. The store entry includes an address location in main memory 150 to which the data is to be written, and a thread identity, for example. The method proceeds to step 415.

At step 450, if the release synchronization event is not a StRel, method 400 proceeds to step 415.

Figure 5:
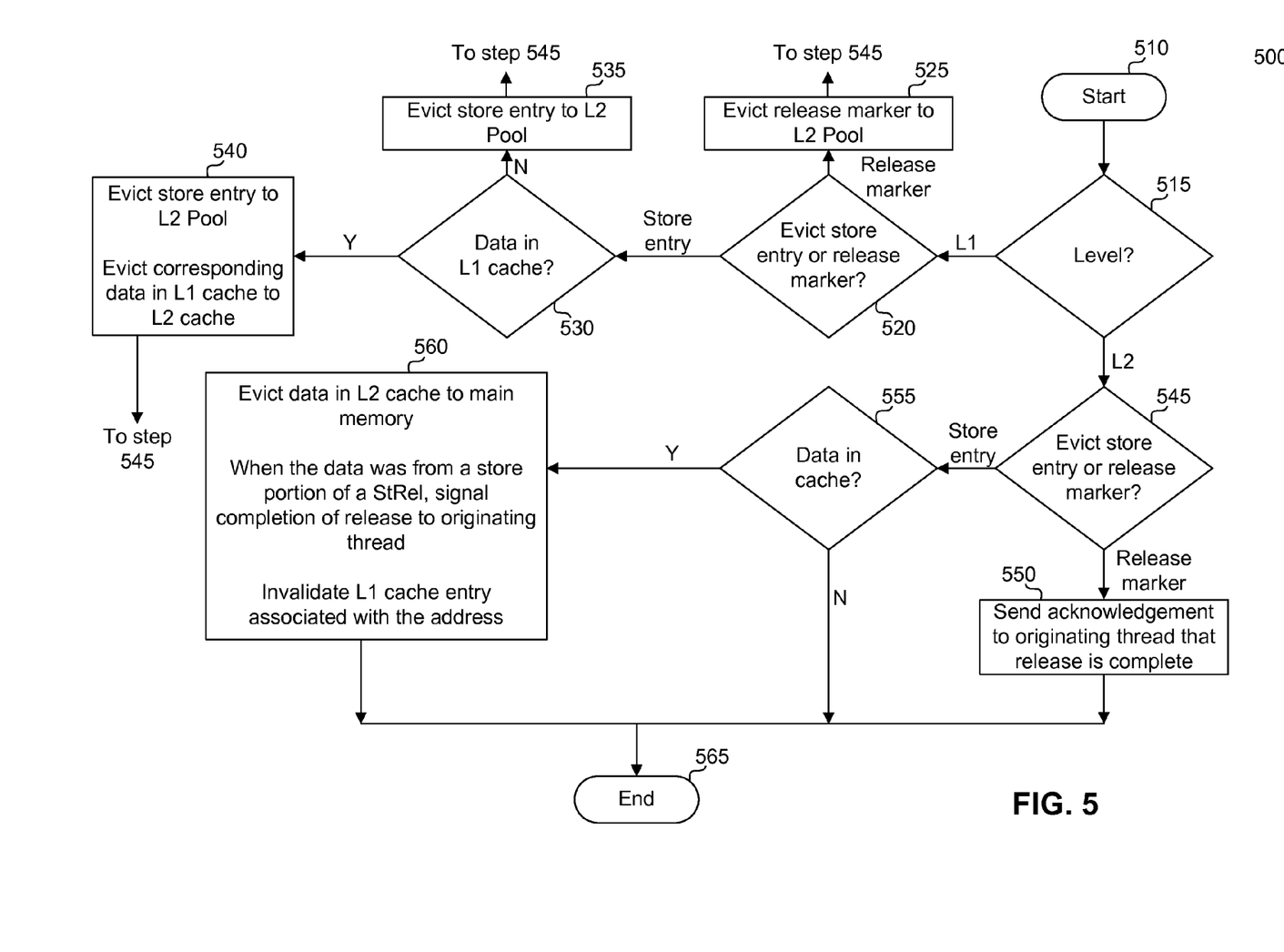
FIG. 5 illustrates a method of evicting entries, according to an embodiment.

FIG. 5 illustrates a method of evicting entries, according to an embodiment. In one example, system 100 and system 300 may be used to demonstrate method 500. It is to be appreciated that operations in method 500 may be performed in a different order than shown, and method 500 may not include all operations shown. For ease of discussion, and without limitation, method 500 will be described in terms of elements shown in FIG. 1 and FIG. 3.

Method 500 depicts the flow of operations when evictions from a pool occur. Evictions can occur, for example, when the number of entries in a pool exceeds a settable maximum value, or when a release marker is added to the pool and triggers prior write evictions. Method 500 includes operations at the L1 pool 350a and L2 pool 360, for example.

Method 500 begins at step 510 and proceeds to step 515.

At step 515, method 500 proceeds to step 520 to depict L1 pool 350a eviction operations.

At step 520, method 500 determines whether L1 pool 350a evicts a store entry or a release marker entry.

If a release marker is present in L1 pool 350a and no prior writes exist ahead of the release marker entry, method 500 determines to evict a release marker entry and proceeds to step 525.

At step 525, the release marker is evicted from L1 pool 350a to L2 pool 360. The release marker is ordered to be after any prior store entries in L2 pool 360. The addition of the release marker triggers evictions of any prior store entries from L2 pool 360, before the eviction of the release marker from L2 pool 360. When a L2 cache 340 is not present, the release marker is evicted from L1 pool 350a, and an acknowledgement is sent to the originating thread that the release is complete.

Method 500 proceeds to step 545.

At step 520, if a release marker is present in L1 pool 350a, the prior store entries in L1 pool 350a ahead of the release marker are determined to be evicted to a L2 pool 360, and corresponding data in L1 cache 320a are correspondingly evicted to L2 cache 340. The prior store entries can be evicted in any order with respect to prior store entries. But, prior store entries and corresponding data in L1 cache 320a are evicted before the oldest release marker is evicted. Thus, the written data is guaranteed to be at the next level of the hierarchy by the time the release marker is evicted.

At step 520, if L1 pool 350a is determined to evict a store entry, method 500 proceeds to step 530.

At step 530, method 500 determines if the corresponding data exists in the read-write L1 cache 320a. If the corresponding data does not exist, method 500 proceeds to step 535. At step 535, a cache replacement policy as is well known in the art, may be enforced and previously evicted the data from L1 cache 320a; the store entry in L1 pool 350a is evicted to L2 pool 360. In addition, a special case of a load event with a partial hit may also cause an early data eviction. Thus, embodiments support early evictions from the memory hierarchy. Method 500 proceeds to step 545.

At step 530, if the corresponding data does exist in the L1 cache 320a, method 500 proceeds to step 540.

At step 540, the store entry in L1 pool 350a is evicted to L2 pool 360. In addition, the corresponding data in L1 cache 320a is evicted to L2 cache 340.

When a L2 cache level is not present (not shown), embodiments include the following: evicting the prior store entry from the L1 pool 350a; evicting data, when present, from the L1 cache 320a associated with the evicted prior store entry to main memory; when the evicted prior store entry is associated with a StRel release synchronization event, signaling completion of release to the originating thread.

When a L2 cache level is present and the L2 cache level is an ordering point (not shown), embodiments further include the following: evicting the prior store entry from L1 pool 350a; evicting data, when present, from the L1 cache 320a associated with the evicted prior store entry to the ordering point; when the evicted prior store entry is associated with a StRel release synchronization event, signaling completion of release to the originating thread. Thus, a StRel can complete at an ordering point other than main memory, and local synchronization is possible (e.g., receipt of a LdAcq can complete at L2 cache 340 without having to access main memory 150). Note that main memory can also be an ordering point and would be a global ordering point.

Method 500 proceeds to step 545.

At step 515, method 500 proceeds to step 545 to depict L2 pool 360 eviction operations.

At step 545, method 500 determines whether L2 pool 360 evicts a store entry or a release marker entry. Evictions may occur when a release marker entry is added to L2 pool 360 that triggers evictions, or when the number of L2 pool 360 entries exceeds a configurable threshold, for example. If L2 pool 360 evicts a release marker entry, method 500 proceeds to step 550.

At step 550, the release marker is evicted from L2 pool 360. In addition, method 500 transmits an acknowledgment to the originating thread or original requester, CU 310a, that the release event is complete. This provides assurance that safe forward progress is possible beyond the release synchronization event.

Note that for a StRel release synchronization event, CU 310a does not need to wait for the acknowledgement, but rather CU 310a can continue processing other memory events until executing the next LdAcq. But, for barrier and fence release synchronization events, CU 310a waits until a corresponding acknowledgement is received. Further, additional embodiments enable unsynchronized stores, if allowed by the memory model. These unsynchronized stores would not generate a store entry in L1 Pool 350a, rather, corresponding data could be written to L1 cache 320a. Thus, unsynchronized stores would not load pool components with unnecessary operations.

The method proceeds to step 565.

At step 545, if L2 pool 360 evicts a store entry, method 500 proceeds to step 555.

At step 555, method 500 determines if the corresponding data exists in the read-write L2 cache 340. If the corresponding data does not exist, (e.g., due to a cache replacement policy enforcement) the store entry is evicted from L2 pool 360 and method 500 proceeds to step 565.

At step 555, if the corresponding data does exist, method 500 proceeds to step 560.

At step 560, the store entry is evicted from L2 pool 360. In addition, the corresponding data in L2 cache 340 is evicted to main memory 150. Further, if the data was from a store event portion of a StRel, method 500 signals completion of release to the originating thread.

Embodiments invalidate all data in L1 caches 320a and 320b associated with the corresponding address. The invalidations may be completed by broadcasting invalidation messages to all L1 read-write combining caches, L1 cache 320a and 320b, to ensure release consistency. The invalidations are not critical to performance as the invalidations only delay release synchronization completions and are bound based on the number of entries in L2 pool 360 when a release synchronization event occurs. Note that write evictions and load requests do not stall waiting for invalidations. In addition, the data in L1 320a and L1 320b can be invalidated with a flash clear, e.g., when a LdAcq is received, all blocks in the cache are invalidated. The flash clear does not need to be associated with the corresponding address.

Method 500 proceeds to step 565.

Logically, L1 pool 350a, L1 pool 320b, and L2 pool 360 may be implemented per thread identity or group of threads (e.g., wavefront identity).

Figure 6:
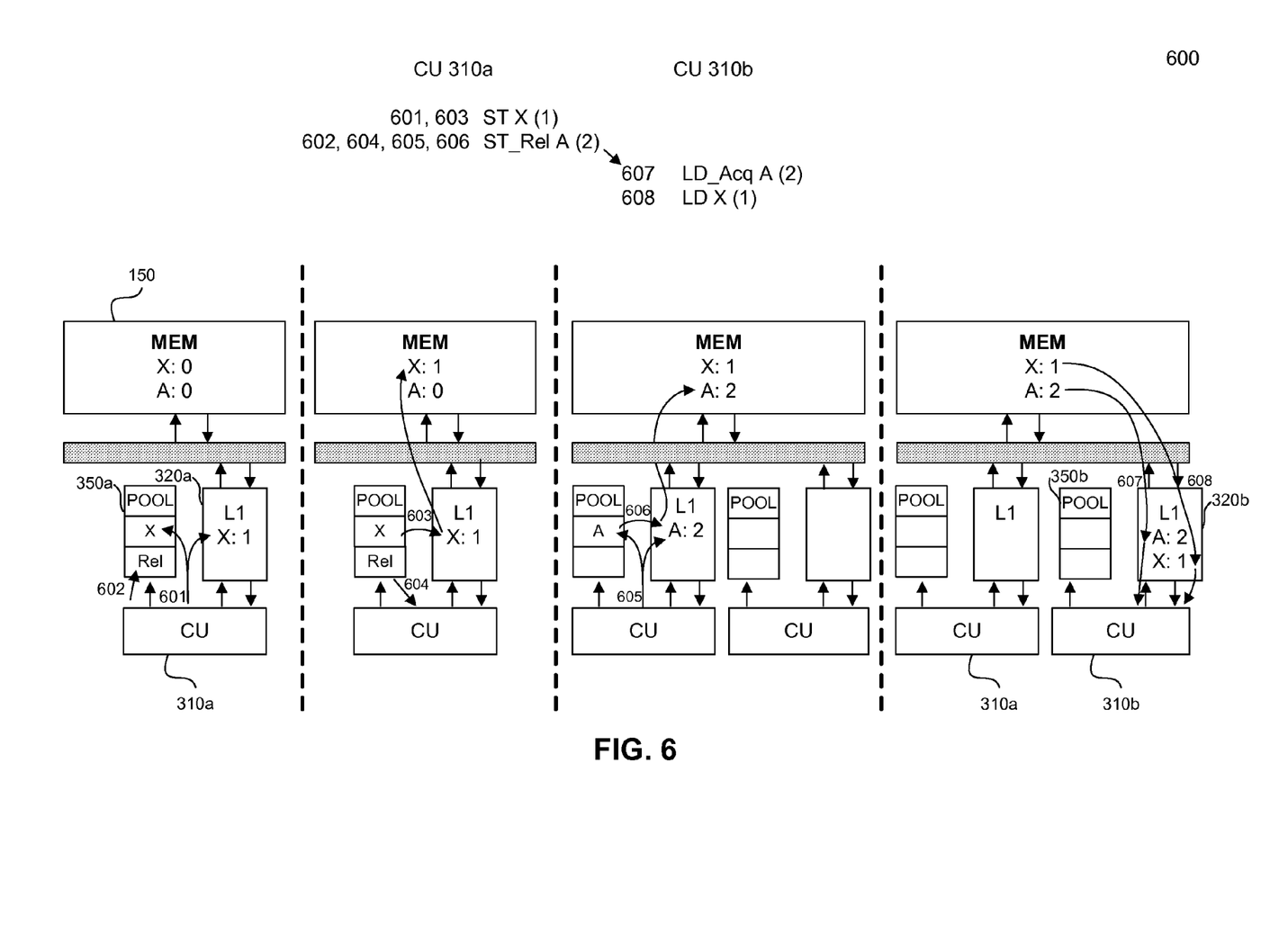
FIG. 6 illustrates a method of handing memory synchronization events, according to an embodiment.

FIG. 6 illustrates a method of handing memory synchronization events, according to an embodiment. In one example, system 100 and system 300 may be used to demonstrate method 600. It is to be appreciated that operations in method 600 may be performed in a different order than shown, and method 600 may not include all operations shown. For ease of discussion, and without limitation, method 600 will be described in terms of elements shown in FIG. 1 and FIG. 3.

The top portion of FIG. 6 includes an execution order of two threads, one from compute unit CU 310a and another from CU 310b, communicating a value in a simple system that contains one level of read-write combining cache including L1 cache 320a and L1 cache 320b. The lower portion of FIG. 6 illustrates method 600.

Method 600 begins at step 601 when CU 310a issues a store event, ST X (1), and writes data, 1, to a cache block in a cache line of L1 cache 320a, associated with address X in main memory 150. In addition, a store entry is added to L1 pool 350a that can include but is not limited to the address, X, associated with the data and a thread identity. If prior store entries are present, the new store entry is added to the group of prior store entries and no particular order is maintained. However, if a release marker is present, the new store entry would be ordered to be after the most-recent release marker. If prior store entries are present after the most-recent release marker, the new store entry would join that group and no particular order is maintained among the prior store entries.

At step 602, CU 310a issues a StRel synchronization event that triggers pool evictions through the memory hierarchy to main memory 150. A release marker (Rel) entry is added to L1 pool 350a, and is ordered to be after any prior store entries in L1 pool 350a, to be evicted after the prior write entries in L1 pool 350a are evicted.

At step 603, L1 pool 350a begins evicting prior write entries ordered before the release marker (Rel). The entry associated with address X is evicted from L1 pool 350a, and the corresponding data in the cache in L1 cache 320a associated with address X is evicted to main memory 150.

At step 604, the prior write entries have been evicted from L1 pool 350a, the release marker (Rel) is evicted from L1 pool 350a and an acknowledgement is sent to CU 310a to signal that the release event portion of the StRel is complete.

At step 605, CU 310a issues the store event portion of the StRel synchronization event and writes data, 2, to a cache in L1 cache 320a associated with address A. In addition, a L1 pool 350a store entry is added that may include but is not limited to the address, A, associated with the cached data, and a thread identity. In an embodiment, an entry of the store event portion of a StRel to L1 pool 350a will trigger L1 pool 350a evictions.

At step 606, the prior write associated with address A is eventually evicted from L1 pool 350a (e.g., if the number of pool entries exceed a settable maximum value (not shown) or another release synchronization event occurs (not shown)). When the entry associated with address A is evicted from L1 pool 350a, the data associated with address A in L1 cache 320a is evicted to main memory 150 and signals completion of the release event portion of the StRel synchronization event to other threads in the system. The data at address A in main memory 150 is now visible to all threads in the system.

At step 607, CU 310b issues a load acquire LdAcq synchronization event to complete the synchronization. Method 600 searches L1 cache 320b, to read the data at address A, and when the address A is not found (a miss), method 600 searches main memory 150. When the address A and corresponding data, 2, are found and read from main memory 150 (a hit), the data is copied (i.e., loaded) to L1 cache 320*b* and is transmitted to (i.e., read by) CU 310*b*.

At step 608, CU 310*b* issues a load event and searches L1 cache 320*b*, to read the data at address X, and when the address X is not found (a miss), method 600 searches main memory 150. When the address X and corresponding data, 1, are found and read from main memory 150 (a hit), the data is copied to L1 cache 320*b* and is read by CU 310*b*.

In an embodiment, a pool can be implemented with a synchronization First In First Out (S-FIFO) that maintains complete order for prior writes as well as a release synchronization event. For example, at step 601, when a store event occurs, an entry would be made to the tail of an S-FIFO that can include but is not limited to the address, X, associated with the data and a thread identity. If prior writes are present, the new L1 pool 350*a* store entry would be added to the tail of the queue and complete order is maintained among the prior writes as well as the release synchronization events.

When the S-FIFO is filled, method 600 would begin to dequeue the S-FIFO. This is similar to a pool component exceeding a settable maximum value. The entry at the top of the S-FIFO and the corresponding cache in the L1 cache 320*a* would be evicted to the corresponding next-level S-FIFO and next-level cache, e.g. L2 cache 340 if present. If the next-level cache is not present, the entry at the top of the S-FIFO is removed (e.g., popped) and the corresponding cache in L1 cache 320*a* is written to main memory 150.

Logically there can be a S-FIFO per thread, but physically the S-FIFO can be implemented as a single FIFO, or as many FIFOs that are partitioned based on thread identity or a group of thread identities. Thus the physical implementation can balance space versus performance concerns.

Figure 7:
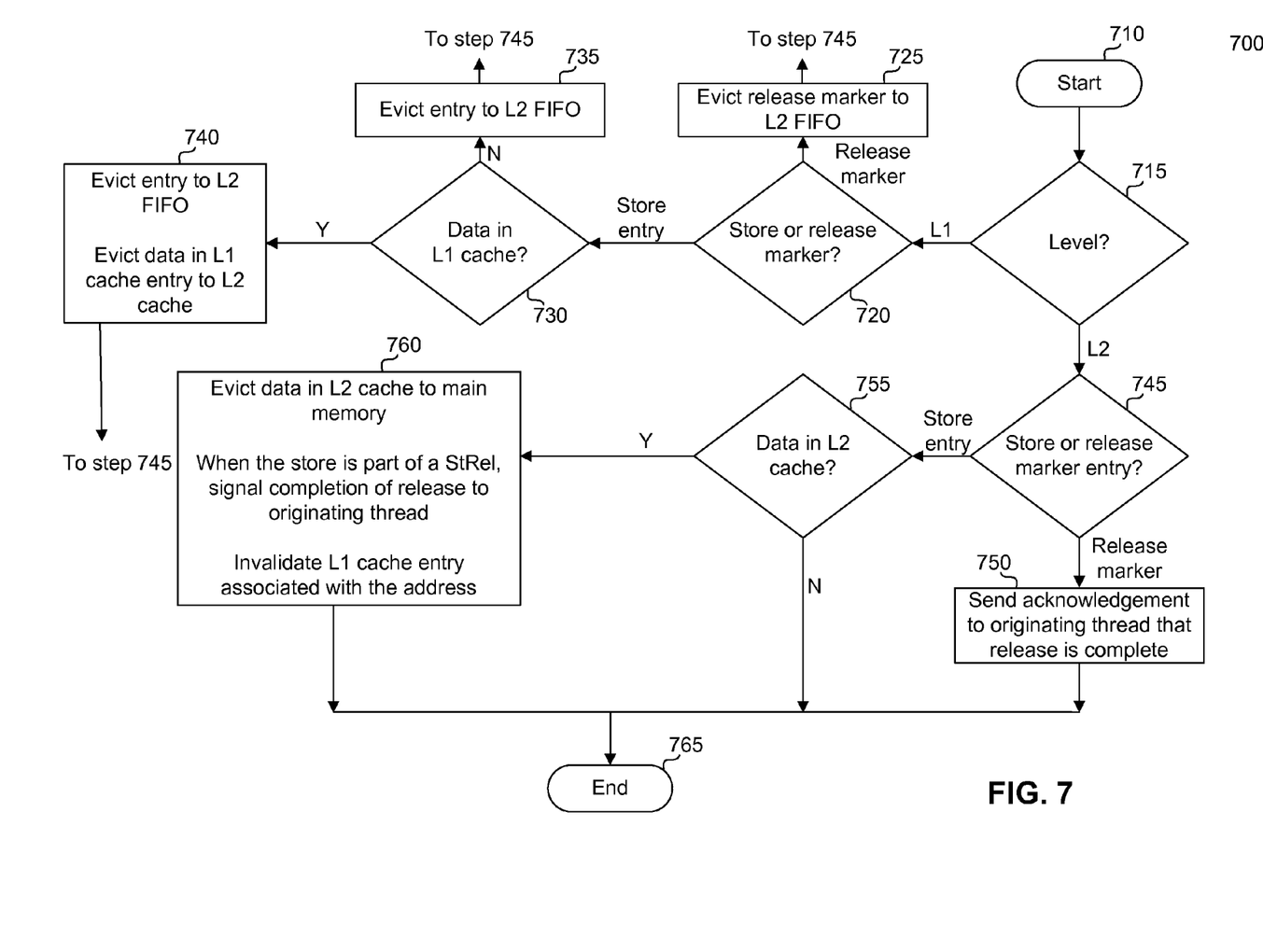
FIG. 7 illustrates a method of evicting entries from a queue, according to an embodiment.

FIG. 7 illustrates a method of evicting entries, according to an embodiment. In one example, system 100 and system 300 may be used to demonstrate method 700. It is to be appreciated that operations in method 700 may be performed in a different order than shown, and method 700 may not include all operations shown. For ease of discussion, and without limitation, method 700 will be described in terms of elements shown in FIG. 1 and FIG. 3.

Method 700 depicts the flow of operations when evictions from a queue such as a First In First Out (FIFO) instead of a pool occur. Evictions can occur, for example, when the number of entries in the FIFO exceeds the size of the FIFO and the entry at the head of the FIFO is popped off the FIFO, or when a release marker is added to the tail of the FIFO and triggers prior write evictions. Method 700 includes operations at a L1 FIFO and L2 FIFO (not shown), for example.

Method 700 begins at step 710 and proceeds to step 715.

At step 715, method 700 proceeds to step 720 to depict L1 FIFO eviction operations.

At step 720, method 700 determines whether L1 FIFO evicts a store entry or a release marker entry.

When a release marker is present in L1 FIFO and no prior writes exist ahead of the release marker entry, method 700 evicts a release marker entry and proceeds to step 725.

At step 725, the release marker is evicted from the head of L1 FIFO to the tail of L2 FIFO. The addition of the release marker triggers evictions of any prior store entries from L2 FIFO until the release marker itself is evicted from the head of L2 FIFO. When a L2 cache 340 (and hence L2 FIFO) is not present, the release marker is evicted from L1 FIFO, and an acknowledgement is sent to the originating thread that the release is complete.

Method 700 proceeds to step 745.

At step 720, if a release marker is present in L1 FIFO, the prior store entries in L1 FIFO ahead of the release marker are evicted in turn, to a L2 FIFO, and corresponding data in L1 cache 320*a* are correspondingly evicted to L2 cache 340. The prior store entries are evicted in the order of placement in L1 FIFO. Thus, the written data is guaranteed to be at the next level of the hierarchy by the time the release marker is evicted.

At step 720, if L1 FIFO evicts a store entry, method 700 proceeds to step 730.

At step 730, method 700 determines if the corresponding data exists in the read-write L1 cache 320*a*. When the corresponding data does not exist, method 700 proceeds to step 735. At step 735, a cache replacement policy as is well known in the art, may be enforced and previously evicted the data from L1 cache 320*a*; the store entry at the head of L1 FIFO is evicted to the tail of L2 FIFO. Thus, embodiments support early evictions from the memory hierarchy.

Method 700 proceeds to step 745.

At step 730, if the corresponding data does exist in the L1 cache 320*a*, method 700 proceeds to step 740.

At step 740, the store entry at the head of L1 FIFO is evicted to the tail of L2 FIFO. In addition, the corresponding data in L1 cache 320*a* is evicted to L2 cache 340.

When a L2 cache level is not present (not shown), embodiments include the following: evicting the prior store entry from the head of L1 FIFO; evicting data, when present, from the L1 cache 320*a* associated with the evicted prior store entry to main memory; when the evicted prior store entry is associated with a StRel release synchronization event, signaling completion of release to the originating.

When a L2 cache level is present and the L2 cache level is an ordering point (not shown), embodiments further include the following: evicting the prior store entry from L1 FIFO; evicting data, when present, from the L1 cache 320*a* associated with the evicted prior store entry to the ordering point; when the evicted prior store entry is associated with a StRel release synchronization event, signaling completion of release to the originating thread. Thus, a StRel can complete at an ordering point other than main memory, and local synchronization is possible (e.g., receipt of a LdAcq can complete at L2 cache 340 without having to access main memory 150). Note that main memory can also be an ordering point and would be a global ordering point.

Method 700 proceeds to step 745.

At step 715, method 700 proceeds to step 745 to depict L2 FIFO eviction operations.

At step 745, method 700 determines whether L2 FIFO evicts a store entry or a release marker entry. Evictions may occur when a release marker entry is added to the tail of L2 FIFO that triggers evictions, or when the number of L2 FIFO entries exceeds a configurable threshold, for example. If L2 FIFO determines to evict a release marker entry, method 700 proceeds to step 750.

At step 750, the release marker is evicted from L2 FIFO. In addition, method 700 transmits an acknowledgment to the originating thread or original requester, CU 310*a*, that the release event is complete. This provides assurance that safe forward progress is possible beyond the release synchronization event.

Note that for a StRel release synchronization event, CU 310*a* does not need to wait for the acknowledgement, but rather CU 310*a* can continue processing other memory events until executing the next LdAcq. But, for barrier and fence release synchronization events, CU 310*a* waits until a corresponding acknowledgement is received. Further, additional embodiments enable unsynchronized stores, if allowed by the memory model. These unsynchronized stores would not generate a store entry in L1 FIFO, rather, corresponding data could be written to L1 cache 320a. Thus, unsynchronized stores would not load pool components with unnecessary operations.

The method proceeds to step 765.

At step 745, if L2 FIFO determines to evict a store entry, method 700 proceeds to step 755.

At step 755, method 700 determines if the corresponding data exists in the read-write L2 cache 340. If the corresponding data does not exist, (e.g., due to a cache replacement policy enforcement) the store entry is evicted from the head of L2 FIFO and method 700 proceeds to step 765.

At step 755, when the corresponding data does exist, method 700 proceeds to step 760.

At step 760, the store entry is evicted from the head of L2 FIFO. In addition, the corresponding data in L2 cache 340 is evicted to main memory 150. Further, if the data was from a store event portion of a StRel, method 700 signals completion of release to the originating thread.

Embodiments invalidate all data in L1 caches 320a and 320b associated with the corresponding address. The invalidations may be completed by broadcasting invalidation messages to all L1 read-write combining caches, L1 cache 320a and 320b, to ensure release consistency. The invalidations are not critical to performance as the invalidations only delay release synchronization completions and are bound based on the number of entries in L2 FIFO when a release synchronization event occurs. Note that write evictions and load requests do not stall waiting for invalidations. In addition, the data in L1 320a and L1 320b can be invalidated with a flash clear, e.g., when a LdAcq is received, all blocks in the cache are invalidated. The flash clear does not need to be associated with the corresponding address.

Method 700 proceeds to step 765.

Logically, L1 FIFO and L2 FIFO may be implemented per thread identity or group of threads (e.g., wavefront identity).

In another embodiment, a pool of entries can be implemented with a Bloom-filter with a set of entries. A Bloom filter is an inexact representation of a set of elements. Bloom filters are implemented with an array of bits, and that array is indexed through two or more hash functions. To insert an element in the bloom filter, the element is hashed and all corresponding bits are set. To test membership, the element is hashed and all corresponding bits are checked. If all bits are set (e.g., to "1"), the element may be in the set. If any one of the bits is cleared (e.g., to "0"), the element is not in the set. Unlike a mathematical set, Bloom filters have no remove function (though a variant called a counting bloom filter does). A signature is a representation of a set of elements. It can be implemented with a bloom filter, an exact list (and/or array), or a FIFO, for example.

In summary, a prior store event is guaranteed to be ordered in the memory hierarchy whenever the store event has been evicted from a pool, dequeued from a FIFO, or tested for membership in a set using a Bloom-filter.

Figure 8:
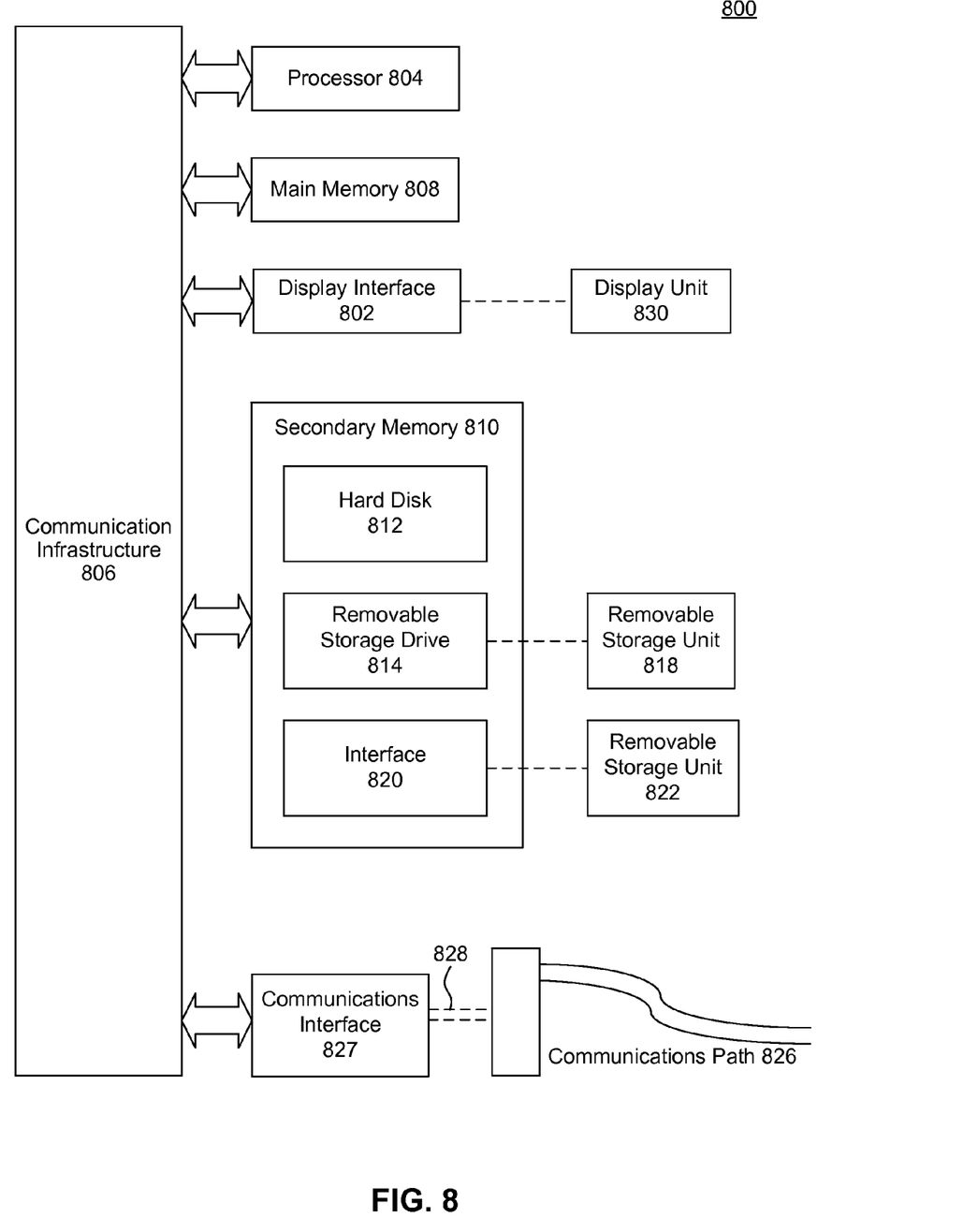
FIG. 8 illustrates an example computer system in which embodiments may be implemented.

Various aspects of the disclosure can be implemented by software, firmware, hardware, or a combination thereof. FIG. 8 illustrates an example computer system 800 in which some embodiments, or portions thereof, can be implemented as computer-readable code. For example, the methods 400-700, of FIGS. 4 through 7 can be implemented in system 800. Various embodiments are described in terms of the example computer system 800. After reading this description, it will become apparent to a person skilled in the relevant art how to implement the embodiments using other computer systems and/or computer architectures.

Computer system 800 includes one or more processors, such as processor 804. Processor 804 can be a special purpose or a general purpose processor. Examples of processor 804 are CPU 110 and GPU 130 of FIG. 1, or a GPGPU, or APU as described earlier. Processor 804 is connected to a communication infrastructure 806 (for example, a bus or network) such as bus 140 of FIG. 1.

Computer system 800 also includes a main memory 808, such as random access memory (RAM) such as main memory 150 of FIG. 1, and may also include a secondary memory 810. Secondary memory 810 may include, for example, a hard disk drive 812, a removable storage drive 814, and/or a memory stick. Removable storage drive 814 may comprise a floppy disk drive, a magnetic tape drive, an optical disk drive, a flash memory, or the like. The removable storage drive 814 reads from and/or writes to a removable storage unit 818 in a well-known manner. Removable storage unit 818 may comprise a floppy disk, magnetic tape, optical disk, etc. that is read by and written to by removable storage drive 814. As will be appreciated by persons skilled in the relevant art(s), removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 that allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 are in the form of signals that may be electronic, electromagnetic, optical, or other signals capable of being received by communications interface 824. These signals are provided to communications interface 824 via a communications path 826. Communications path 826 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 818, removable storage unit 822, and a hard disk installed in hard disk drive 812. Signals carried over communications path 826 can also embody the logic described herein. Computer program medium and computer usable medium can also refer to memories, such as main memory 808 and secondary memory 810, which can be memory semiconductors (e.g. DRAMs, etc.). These computer program products are means for providing software to computer system 800.

Computer programs (also called computer control logic) are stored in main memory 808 and/or secondary memory 810. Computer programs may also be received via communications interface 824. Such computer programs, when executed, enable computer system 800 to implement the embodiments as discussed herein. In particular, the computer programs, when executed, enable processor 804 to implement the disclosed processes, such as the steps in the methods 400-700 of FIGS. 4-7 as discussed above. Accordingly, such computer programs represent controllers of the computer system 800. Where the embodiments are implemented using software, the software may be stored in a computer program product and loaded into computer system 800 using removable storage drive 814, interface 820, hard drive 812 or communications interface 827. This can be accomplished, for example, through the use of general-programming languages (such as C or C++). The computer program code can be disposed in any known computer-readable medium including semiconductor, magnetic disk, or optical disk (such as, CD-ROM, DVD-ROM). As such, the code can be transmitted over communication networks including the Internet and internets. It is understood that the functions accomplished and/or structure provided by the systems and techniques described above can be represented in a core (such as a processing-unit core) that is embodied in program code and may be transformed to hardware as part of the production of integrated circuits. This can be accomplished, for example, through the use of hardware-description languages (HDL) including Verilog HDL, VHDL, Altera HDL (AHDL) and so on, or other available programming and/or schematic-capture tools (such as, circuit-capture tools).

Embodiments are also directed to computer program products comprising software stored on any computer useable medium. Such software, when executed in one or more data processing device, causes a data processing device(s) to operate as described herein. Embodiments employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method comprising:
responsive to a store memory event:
  writing data to a level n cache, where n is an integer greater than zero representing the level of cache hierarchy;
  writing, to a level n pool, a store entry that includes an address location in main memory to which the data in the level n cache is to be written and a thread identity associated with the store entry, wherein the level n pool maintains a partial order among the store entry, a prior received store entry, and a release marker entry;
  when a release marker is present, ordering the store entry in the level n pool to be after a most-recent release marker; and
  when a level (n+1) cache is present: evicting the prior store entry from the level n pool to the level (n+1) pool, and evicting data, when present, from the level n cache associated with the evicted prior store entry, to the level (n+1) cache.

2. The method of claim 1, further comprising:
when a level (n+1) cache level is not present:
  evicting the prior store entry from the level n pool;
  evicting data, when present, from the level n cache associated with the evicted prior store entry to main memory; and
  when the evicted prior store entry is associated with a StRel release synchronization event, signaling completion of release to an originating thread; and
  when n=2, invalidating the data in the level 1 cache associated with the evicted prior store entry.

3. The method of claim 2:
wherein when a level (n+1) is present and the level (n+1) is an ordering point, the method further comprises:
  evicting the prior store entry from the level n pool;
  evicting data, when present, from the level n cache associated with the evicted prior store entry to the ordering point; and
  when the evicted prior store entry is associated with a StRel release synchronization event, signaling completion of release to all threads that share access to the ordering point.

4. The method of claim 1:
wherein when the memory event is a release synchronization event, the method further comprises:
  writing a release marker in the level n pool;
  ordering the release marker to be after any prior store entries in the level n pool; and
  triggering eviction of the prior store entries, when present, from the level n pool before the release marker.

5. The method of claim 4:
wherein when prior store entries in the level n pool before the release marker are evicted, the method further comprises:

when a level (n+1) cache is present:
  evicting the release marker from the level n pool to a level (n+1) pool, wherein the release marker is ordered to be after any prior store entries in the level (n+1) pool;
  when prior store entries are present in the level (n+1) pool before the release marker, triggering eviction of the prior store entries;
when a level (n+1) cache is not present:
  evicting the release marker from the level n pool; and
  sending an acknowledgement to an originating thread that release is complete.

6. The method of claim 4, wherein a release synchronization event includes at least one of a store-release, a release, a kernel end, a barrier, and a fence operation.

7. The method of claim 1, wherein the level n pool is a queue further comprising:
  writing a store entry that includes an address of the data in the level n cache in a tail of the queue that maintains an order of a received store entry and a release marker.

8. A non-transitory computer-readable storage device having stored thereon instructions, execution of which, by a processing unit, cause the processing unit to perform operations comprising:
  responsive to a store memory event:
  writing data to a level n cache, where n is an integer greater than zero representing the level of cache hierarchy;
  writing, to a level n pool, a store entry that includes an address location in main memory to which the data in the level n cache is to be written and a thread identity associated with the store entry, wherein the level n pool maintains a partial order among the store entry, a prior received store entry, and a release marker entry;
  when a release marker is present, ordering the store entry in the level pool to be after a most-recent release marker; and
  when a level (n+1) cache is present:
    evicting the prior store entry from the level n pool to the level (n+1) pool, and
    evicting data, when present, from the level n cache associated with the evicted prior store entry, to the level (n+1) cache.

9. The non-transitory computer-readable storage device of claim 8, further comprising:
  when a level (n+1) cache level is not present:
    evicting the prior store entry from the level n pool;
    evicting data, when present, from the level n cache associated with the evicted prior store entry to main memory;
    when the evicted prior store entry is associated with a StRel release synchronization event, signaling completion of release to an originating thread; and
    when n=2, invalidating data in the level 1 cache associated with the evicted prior store entry.

10. The non-transitory computer-readable storage device of claim 9:
  wherein when a level (n+1) is present and the level (n+1) is an ordering point, the computer-readable storage device further comprises:
    evicting the prior store entry from the level n pool;
    evicting data, when present, from the level n cache associated with the evicted prior store entry to the ordering point;
    when the evicted prior store entry is associated with a StRel release synchronization event, signaling completion of release to all threads that share access to the ordering point.

11. The non-transitory computer-readable storage device of claim 8:
  wherein when the memory event is a release synchronization event, the computer-readable storage device further comprises:
    writing a release marker in the level n pool;
    ordering the release marker to be after any prior store entries in the level n pool; and
    triggering eviction of the prior store entries, when present, from the level n pool before the release marker.

12. The non-transitory computer-readable storage device of claim 11:
  wherein when prior store entries in the level n pool before the release marker are evicted, the computer-readable storage device further comprises:
  when a level (n+1) cache is present:
    evicting the release marker from the level n pool to a level (n+1) pool, wherein the release marker is ordered to be after any prior store entries in the level (n+1) pool;
    when prior store entries are present in the level (n+1) pool before the release marker, triggering eviction of the prior store entries;
  when a level (n+1) cache is not present:
    evicting the release marker from the level n pool; and
    sending an acknowledgement to an originating thread that release is complete.

13. The non-transitory computer-readable storage device of claim 11, wherein a release synchronization event includes at least one of a store-release, a release, a kernel end, a barrier, and a fence operation.

14. The non-transitory computer-readable storage device of claim 8, wherein the level n pool is a queue further comprising:
  writing a store entry that includes an address of the data in the level n cache in a tail of the queue that maintains an order of a received store entry and a release marker.

15. A processing unit comprising one or more compute units configured to:
  responsive to a store memory event:
  write data to a level n cache, where n is an integer greater than zero representing the level of cache hierarchy;
  write, to a level n pool, a store entry that includes an address location in main memory to which the data in the level n cache is to be written and a thread identity associated with the store entry, wherein the level n pool maintains a partial order among the store entry, a prior received store entry, and a release marker entry;
  when a release marker is present, order the store entry in the level n pool to be after a most-recent release marker; and
  when a level (n+1) cache is present:
    evict the prior store entry from the level n pool to the level (n+1) pool, and
    evict data, when present, from the level n cache associated with the evicted prior store entry, to the level (n+1) cache.

16. The processing unit of claim 15, further configured to:
when a level (n+1) cache level is not present:
  evict the prior store entry from the level n pool;
  evict data, when present, from the level n cache associated with the evicted prior store entry to main memory;
  when the evicted prior store entry is associated with a StRel release synchronization event, signal completion of release to an originating thread; and
  when n=2, invalidate the data in the level 1 cache associated with the evicted prior store entry.

17. The processing unit of claim 16:
wherein when a level (n+1) is present and the level (n+1) is an ordering point, the processing unit further configured to:
  evict the prior store entry from the level n pool;
  evict data, when present, from the level n cache associated with the evicted prior store entry to the ordering point;
  when the evicted prior store entry is associated with a StRel release synchronization event, signal completion of release to all threads that share access to the ordering point.

18. The processing unit of claim 15:
wherein when the memory event is a release synchronization event, the processing unit further configured to:
  write a release marker in the level n pool;
  order the release marker to be after any prior store entries in the level n pool; and
  trigger eviction of the prior store entries, when present, from the level n pool before the release marker.

19. The processing unit of claim 18:
wherein when prior store entries in the level n pool before the release marker are evicted, the processing unit further configured to:
when a level (n+1) cache is present:
  evict the release marker from the level n pool to a level (n+1) pool, wherein the release marker is ordered to be after any prior store entries in the level (n+1) pool;
  when prior store entries are present in the level (n+1) pool before the release marker, trigger eviction of the prior store entries;
when a level (n+1) cache is not present:
  evict the release marker from the level n pool; and
  send an acknowledgement to an originating thread that release is complete.

20. The processing unit of claim 15, wherein the level n pool is a queue, the processing unit further configured to:
  write a store entry that includes an address of the data in the level n cache in a tail of the queue that maintains an order of a received store entry and a release marker.

* * * * *